United States Patent [19]
Wilkinson et al.

[11] Patent Number: 5,716,055
[45] Date of Patent: Feb. 10, 1998

[54] METHOD OF MAKING PACKING MATERIAL HAVING EXPANDED GRAPHITE DISPERSED THROUGHOUT

[75] Inventors: Mark R. Wilkinson, Huntington, Mass.; Chester S. Hopper, Newton, Conn.; Leslie K. Muir; Michael S. Muir, both of Corona, Calif.

[73] Assignee: Calconn, Inc., Newton, Conn.

[21] Appl. No.: 684,789

[22] Filed: Jul. 22, 1996

Related U.S. Application Data

[62] Division of Ser. No. 617,521, Mar. 15, 1996.

[51] Int. Cl.⁶ .................. F16J 15/22; F16J 15/24
[52] U.S. Cl. .................. 277/102; 277/100; 277/105; 277/117; 277/227; 277/229
[58] Field of Search .................. 277/102, 105, 277/227, 117, 229, 100

[56] References Cited

U.S. PATENT DOCUMENTS

| | | | |
|---|---|---|---|
| 1,321,919 | 11/1919 | White et al. | 277/122 |
| 3,953,566 | 4/1976 | Gore | 264/288 |
| 4,328,974 | 5/1982 | White et al. | 277/122 |
| 4,431,698 | 2/1984 | Case et al. | 428/244 |
| 4,559,862 | 12/1985 | Case et al. | 87/1 |
| 4,667,969 | 5/1987 | Suggs, III | 277/230 |
| 4,795,171 | 1/1989 | Quevo Del Rio | 277/106 |
| 5,050,298 | 9/1991 | Dodson | 29/888.3 |
| 5,135,240 | 8/1992 | Dodson | 277/188 A |
| 5,370,926 | 12/1994 | Hopper | 428/241 |
| 5,499,827 | 3/1996 | Suggs et al. | 277/229 |
| 5,522,603 | 6/1996 | Naitou et al. | 102/102 |
| 5,527,047 | 6/1996 | Waterland, III | 277/235 R |

OTHER PUBLICATIONS

*Machine Design* "Seal", p. 42, Figure 6 & col. 1.

*Primary Examiner*—Diego F. F. Gutierrez
*Assistant Examiner*—Christina Annick
*Attorney, Agent, or Firm*—Stroock & Stroock & Lavan LLP

[57] ABSTRACT

A minimum leakage packing system is provided for sealing pump shafts and the like. The packing is manufactured from twisted, exfoliated extruded, pultruded or slit graphite material that is braided, twisted, laid up or otherwise combined to form mechanical packing. A lubricant and/or sealant may be applied to the finished packing. Graphite foil may be applied to the packing for enhanced properties. The packing system preferably consists of a precision wedge set and at least three rings including compressible graphite material, the rings compressed to different percentages of their original heights. The outside rings will have the most compression and the inner ring or rings of the multi-ring assembly the least. All should be compressed less than the maximum amount to permit high conformance to the surface being sealed. The system may have an optional gasket washer following the last ring of compressed graphite material.

12 Claims, 2 Drawing Sheets

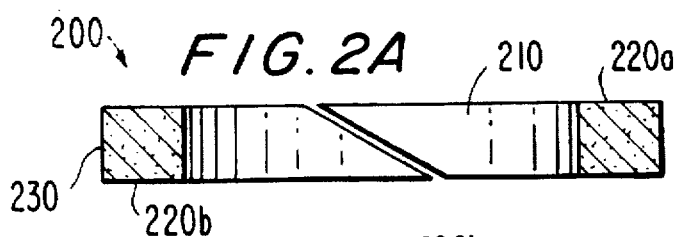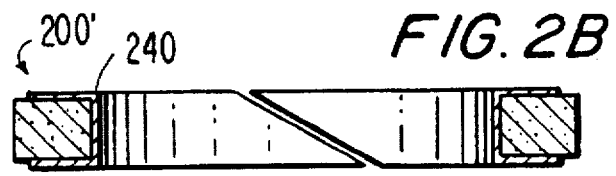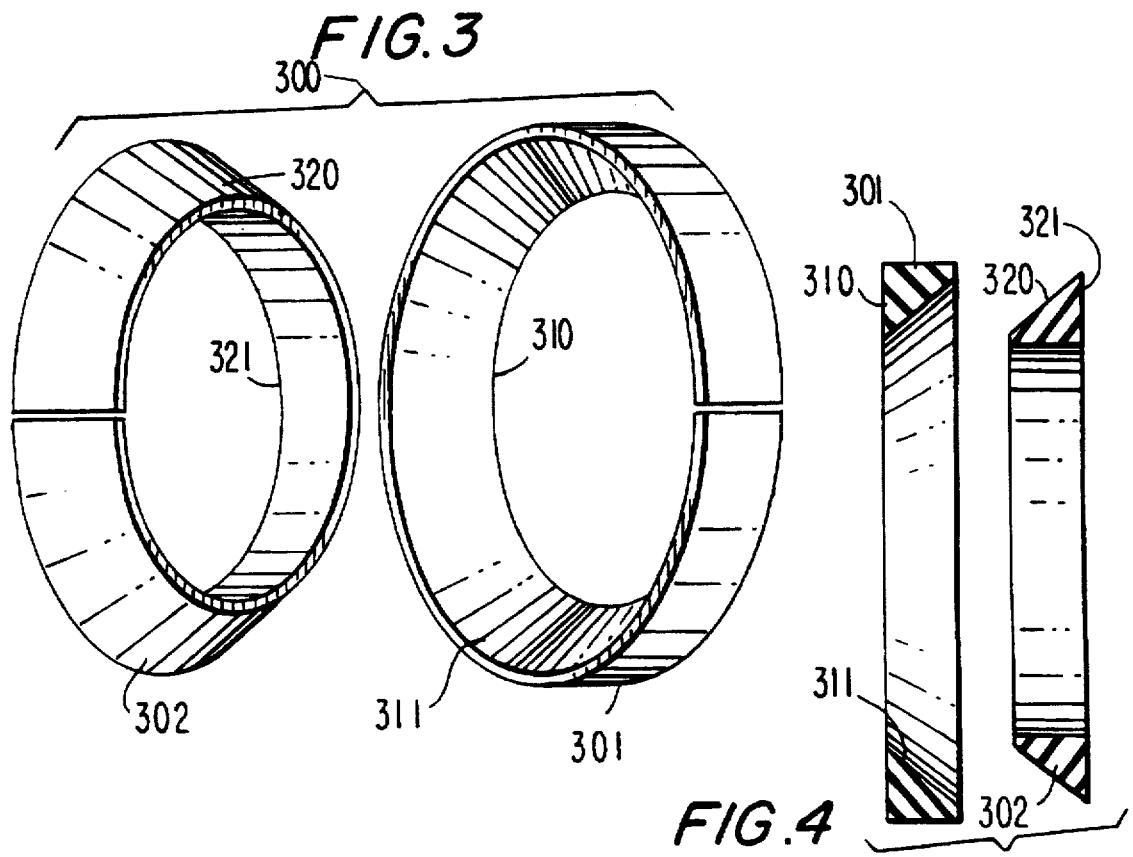

METHOD OF MAKING PACKING MATERIAL HAVING EXPANDED GRAPHITE DISPERSED THROUGHOUT

CROSS-REFERENCE TO RELATED APPLICATIONS

This is a Divisional Application based on application Ser. No. 08/617,521 filed on Mar. 15, 1996.

BACKGROUND OF THE INVENTION

The invention relates generally to a packing system and more particularly to material for sealing and preventing leakage around pump shafts, rods and the like.

Many industrial processes use a water suspension system to move materials or manufacture final products. Examples of industries where this is common include paper manufacturing, domestic and industrial waste disposal and mining. Each of these industries employ processes where suspensions are moved with pumps. Other industrial processes employ pumps to move large quantities of liquids for various other purposes.

A conventional pump includes a motor and some sort of impeller, such as a blade or piston. The motor is typically outside of the flow of fluid and the impeller is typically exposed to the flow of fluid. Energy is typically provided from the motor to the impeller through a shaft or rod. It is thus necessary to seal the fluid being pumped from the opening for the shaft, while permitting the shaft to spin or reciprocate at high speeds for long durations of time.

One method of sealing shafts is to provide a mechanical seal in the form of a high precision machined rotating disk with a matching sealing face precisely fitted to the rotating shaft. However, such a construction is expensive to manufacture, frustrating to maintain and difficult to repair. Thus, the use of such mechanical seals is limited.

A more common approach is to employ a stuffing box filled with a conventional braided packing material. Such material surrounds the shaft and permits the shaft to rotate therein while substantially preventing liquids or gases from leaking out of the pump housing. Conventional stuffing boxes for many pumps are designed to permit a small mount of fluid to leak through the stuffing box and out of the pump. The fluid leakage is permitted to increase the lubrication properties of the stuffing material and provide for heat transfer. When dangerous or inconvenient fluids or suspensions are being pumped, it is also common to provide the stuffing box with a water inlet, to permit water flow through the stuffing box, isolating the problem fluid, while allowing leakage of water to provide lubrication and cooling of the packing.

In each of these conventional operations involving the controlled leakage of liquid through the packing material, it is not uncommon for 1–3 gallons per day or more of liquid to be consumed and/or leak out of the stuffing box. For a facility having 1,000 pumps or more, it is clear that the total daily amount of liquids leaking from pumps can be quite high.

In recent years, the cost of water in most industrial processes has risen significantly and the cost of cleaning up the wastewater of industrial processes has risen even more. During the manufacture of paper, the treatment of domestic and industrial waste and mining, much of the water leaking through normal braided packing installations is contaminated and requires significant cleanup procedures before it can be discharged back to natural sources, such as rivers, lakes and streams. Vapors and other undesirable emissions are also permitted to escape from conventional pumps and valves.

Accordingly, it is desirable to provide a packing material that can overcome drawbacks of the prior art.

SUMMARY OF THE INVENTION

Generally speaking, in accordance with the invention, a substantially leak free waterless packing material and system are provided for sealing pump shafts and the like. The packing is manufactured from twisted, exfoliated, extruded, pultruded or slit graphite material that is braided, twisted, laid up or otherwise combined to form mechanical packing. A lubricant and/or sealant may be applied to the finished packing. Graphite foil may be applied to the packing for enhanced properties. The packing preferably is formed with at least three rings including compressible graphite packing, the rings compressed to different percentages of their original heights. The outside rings will have the most compression and the inner ring or rings of the multi-ring assembly the least. All should be compressed less than the maximum mount possible to permit high conformance to the surface being sealed.

Accordingly, it is an object of the invention to provide improved packing material.

Another object of the invention is to reduce or eliminate the amount of leakage of liquids and vapors from pump seals.

Another abject of the invention is to eliminate the need for a flush or barrier fluid, injected into the middle of the stuffing box, resulting in the dilution of the process fluid and additional leakage from the pump or rotating shaft.

A further object of the invention is to provide an improved method of manufacturing packing material.

Still another object of the invention is to provide an improved packing product to significantly limit or eliminate leakage through seals.

Yet another object of the invention is to provide an improved packing material that can be used in a conventional stuffing box and operated with little or no leakage of liquid past the packing.

Still other objects and advantages of the invention will be in part obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawings, in which:

FIGS. 2A, 2B and 2C are cross-sectional views of packing material in accordance with an embodiment of the invention in relative stages of compression;

FIG. 3 is a perspective view of an expanding inner bushing for use in a packing assembly in accordance with an embodiment of the invention; and FIG. 4 is a cross-sectional view of the bushing of FIG. 3.

DETAILED DESCRIPTION OF THE PREFERRED EMBODIMENTS

Figure 1:
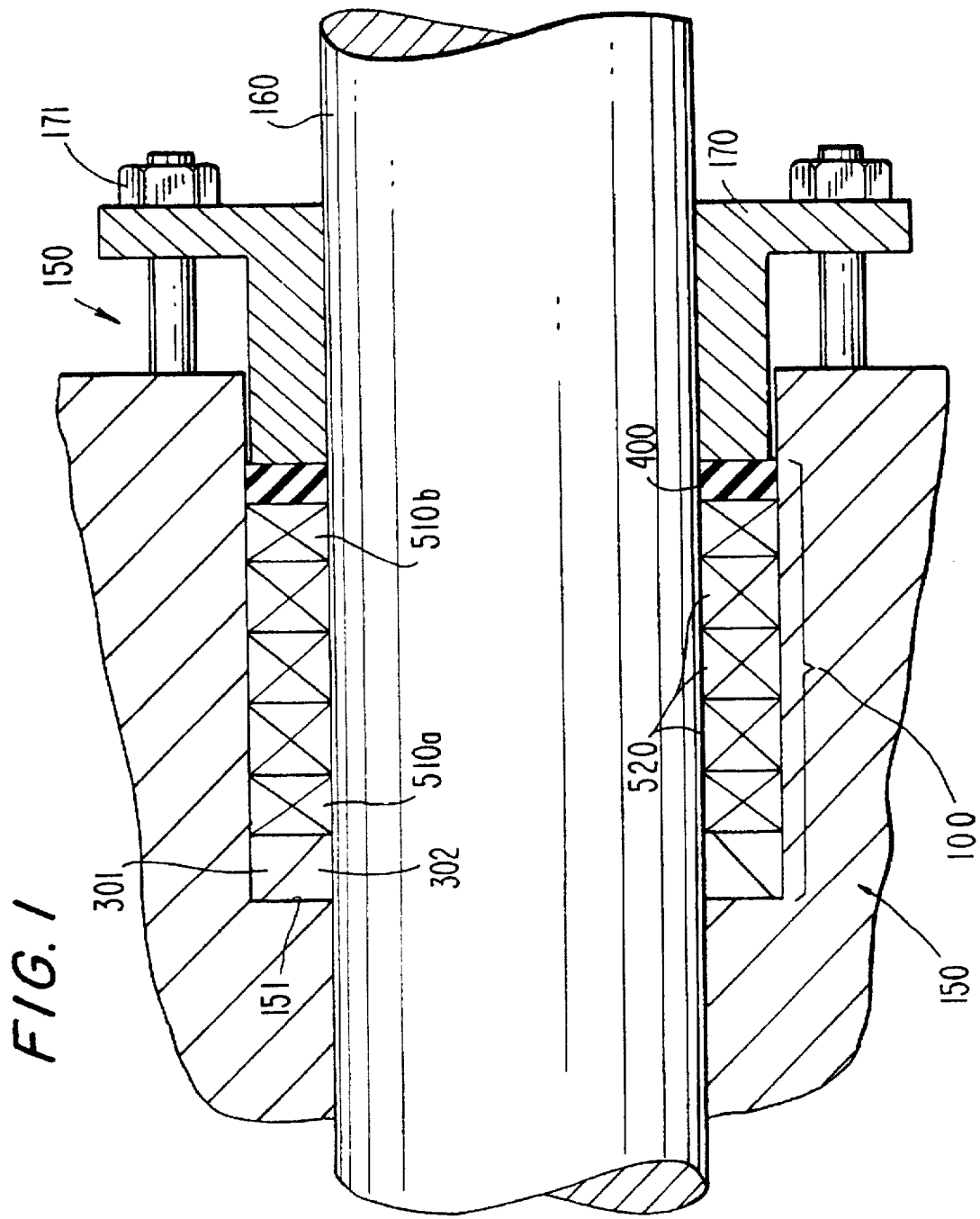
FIG. 1 is a cross-sectional view of a stuffing box for a pump or other rotating shaft packed with packing material in accordance with an embodiment of the invention.

A flushless and waterless packing assembly in accordance with the invention is intended to operate with little or no leakage past the packed seal. Whereas conventional braided packing is generally operated with some leakage to permit heat transfer and enhance lubrication, packing in accordance with the invention has suitable heat transfer properties and a suitably low co-efficient of friction that it can be operated with minimal or even no leakage. The improved sealing assembly in accordance with the invention relies on a specially prepared mechanical packing or a combination of specially prepared packings that can be installed with an improved expanding inner bushing and a thin follower ring.

Referring to FIG. 1, a flushless waterless packing assembly 100, constructed in accordance with a preferred embodiment of the invention is shown installed in a stuffing box 150 around a shaft 160. To install packing assembly 100, stuffing box 150 having a rear wall 151 is opened by loosening a set of gland nuts 71 and removing a gland follower 170 from stuffing box 150. All old packing, if any, is removed and stuffing box 150 is cleaned, if necessary. Assembly 100 is then installed over shaft 160 by first installing an optional wedge set expandable bushing 300, shown in FIGS. 3 and 4. Wedge set 300 includes a female or concave half 301 and a male or convex half 302.

Convex half 302 is slipped over shaft 160 and a flat side 321 of convex half 302 is positioned against rear wall 151 of stuffing box 150. Afterwards, convex half 301 of wedge set 300 is slipped over shaft 160 and positioned so that a convex face 320 of male half 302 nests in a concave or cupped face 311 of female half 301. Wedge set 300 can also be positioned with back wall 310 against rear wall 151. A back wall 310 of concave half 301 is flat and presents a surface perpendicular to shaft 160. Wedge set 300 is advantageously made from a glass/TEFLON composite, with a small amount of molybdenum therein. Such material can be obtained from Industrial Fluoroplastics of Salt Lake City.

A highly compressed end ring 510a of assembly 100 is then slipped over shaft 160 and pushed against back wall 310 of wedge set 300. If wedge set 300 is not used, end ring 510a is disposed against end wall 151 of stuffing box 150. An alternate bushing or washer, similar to gasket washer 400, may be used instead of or in addition to wedge set 300. One or more moderately compressed packing rings 520 (in this case three) are then slipped over shaft 160 and pushed against highly compressed packing ring 510a. Thereafter, a second highly compressed packing ring 510b is slipped over shaft 160 and against the last moderately compressed ring 520. A gasket washer 400 can then be slid against highly compressed packing ring 510b. Gasket 400 can be made of the same material as wedge set 300.

After packing assembly 100 is installed in stuffing box 150, gland follower 170 is replaced and packing assembly 100 is compressed by tightening gland nuts 171. Gland nuts 171 should not be over tightened in order to prevent damaging packing assembly 100.

The packing or combinations of packings of the invention can be manufactured from carbon fibers having graphite particles disposed thereon. The graphite particles are in a foamed or expanded form which is substantially inelastically compressible. The packing substantially will not return to its original dimensions after compression the way polymer foams, such as styrofoam will, after styrofoam is compressed. Such packing also has substantially the same thermal coefficient of expansion as metal and the packing assembly of the invention will therefore maintain its excellent seal as the shaft changes temperature.

A preferred exfoliated graphite yarn for forming packing material in accordance with an embodiment of the invention can be manufactured by heating high purity graphite crystals to a temperature over about 1500° F. This causes a rapid accordion-like expansion of the crystals. Upon cooling, a slurry of the expanded crystals are extruded, pultruded or coated about an approximately 96% pure graphite carrier yarn to form the final yarn to be braided or otherwise combined. The yarn is then sized and stabilized, removing excess flakes of graphite in the process.

These exfoliated graphite yarns are then braided, twisted, laid up or otherwise combined to form a continuous rope of packing material. A core of inorganic fiber combined with Inconel wire with preferably dried but unsintered polytetrafluoroethylene (PTFE) and pure carbon particles thereon or packing braided with inorganic fiber/PTFE yarns or fibers can provide packing material with additional resilience and greater resistance to vapor flow. Such inorganic fiber/PTFE material is described in U.S. Pat. No. 4,431,648, the contents of which are incorporated herein by reference. The rope of braided yarn can then be diagonally cut to size to fit around a shaft of selected diameter and shaped in a die to form a ring of packing material such as packing ring 200 shown in FIG. 2A. The cross-sectional height of packing ring 200 is reduced by compressing ring 200 in a die to form moderately compressed packing ring 200' of FIG. 2B. Additional compression leads to a highly compressed packing ring 200" shown in FIG. 2C.

Unlike conventional packings, packing rings formed in accordance with the invention should not be fully compressed prior to installation. Thus, neither ring 200' nor ring 200" should be in a fully compressed state. Because the rings are not fully compressed prior to installation, they can mold to the precise dimensions of a shaft or packing box during installation and provide an essentially water tight seal. Nevertheless, the use of additional rings in a fully compressed state is not precluded.

In a preferred embodiment of the invention, graphite foil, such as a product sold under the trademark GRAPHOIL, by Union Carbide, is formed around an inner wall 210 of ring 200 prior to compression. The graphite foil is advantageously extended only 25% to 75% up a side wall 220, towards outer wall 230. It is preferable not to wrap the graphite foil completely around all walls of ring 200.

In a preferred method of manufacturing a packing ring assembly in accordance with the invention, a set of at least three rings and preferably 5 to 7 rings are cut to size. Graphite foil is then applied to what will be the inner wall of the packing rings which will rub against the pump shaft and partially up the side walls. Thereafter, the rings that are intended to be the two outside rings of a multi-ring packing assembly are compressed in the die to about 80% of their original height. Compressions of about 75 to 85% are acceptable, as long as the material is not compressed to the fullest extent. The material for one of the inner rings of a multi-ring packing assembly is compressed to only about 90% of its original height. Compressions of about 85 to 95% have been found to be acceptable. Preferred exfoliated graphite packing material can typically be compressed to a maximum of about 65 to 70% of its original height in either normal installation or die forming operations: Thus, the compression amounts should be less than this to insure that the rings will mold to shape during installation.

The inner and outer packing rings are formed with different compression levels for the following reasons. As the gland follower compresses the packing assembly, the inner rings, because they are easier to compress, deform first. The higher initial compression of the outer rings aids both in the uniform compression of the inner rings and in preventing extrusion of the softer inner rings around the wedge set, gasket washer or stuffing box. The graphite foil on the inside wall of all rings presents a low friction, impermeable rubbing surface to the shaft being sealed. The packing assembly also exhibits an extremely high heat transfer coefficient. Thus, the assembly can be run dry, with suitable friction and heat transfer properties.

Because the rings of the packing assembly of the invention have considerably less initial compression than a conventional die formed packing set, the rings, in particular the inner rings, will seat extremely well to the bore of the stuffing box and to the shaft. Thus, tightening of the gland nuts permits additional deformation of the packing as required to completely fill any minute voids in the stuffing box while properly conforming to the shaft. The configuration and construction also permits a substantially uniform unit loading to all portions of the seal. This additional tightening capability will also permit the packing of the invention to conform better to worn or slightly irregular shafts.

The expanding inner bushing helps prevent the extrusion of any of the packing material into the throat or base of the stuffing box around the shaft of the device. It also helps limit the mount of suspended particles in the media being sealed, from entering or contacting the packing around the shaft. This minimizes wear on the shaft and possible damage to the inside diameter of the packing. The optional thin gasket washer helps ensure a more uniform load as well as minimize any extrusion of the inner or outer wall of the last packing ring, in the case of an imperfect seal between the gland follower and shaft or stuffing box.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method of forming packing material, comprising the steps of:
    providing a quantity of graphite particles; heating the particles to create expanded graphite particles and covering a plurality of carbon fiber yarns with the expanded graphite particles; and then combining the yarns covered with the expanded graphite particles to form packing material.

2. The method of claim 1, wherein the yarns with expanded particles thereon are braided together.

3. The method of claim 1, including the steps of combining the yarns with expanding particles thereon into a rope of packing material; cutting pieces of the rope to form at least two outer rings and at least one inner ring; forming the pieces of rope into ring shapes in a die and compressing the pieces in the die to a state of partial compression less than the maximum compression.

4. The method of claim 3, wherein the pieces for the outer rings are compressed to about 75% to 85% of their original height and the piece for the at least one inner ring is compressed to about 85% to 95% of its original height.

5. The method of claim 2, wherein each of the rings has an inner surface configured to abut a shaft, side walls extending radially from the inner surface and an outer surface connecting the side walls and graphite foil is disposed on the inner surface of the rings.

6. The method of claim 4, wherein each of the rings has an inner surface configured to abut a shaft, side walls extending radially from the inner surface and an outer surface connecting the side walls and graphite foil is disposed on the inner surface of the rings and on the side walls, about 25% to 75% of the way from the inner surface to the outer surface.

7. A method of operating a stuffing box for a pump shaft seal of a pump for liquids, comprising:
    packing the stuffing box with packing rings formed from a quantity of graphite particles which were heated and expanded to create expanded graphite particles and disposed around a plurality of carbon fiber yarns to form yarns covered with the expanded graphite particles and then combined to form packing material made from carbon fiber yarns combined with graphite particles in an expanded condition, the rings combined in sets having a first and third outer rings and at least one second inner ring, the outer rings compressed to about 75% to 85% of their original height and the at least one inner ring compressed to about 85% to 95% of its original height; and thereafter compressing the packing rings against the seal and substantially preventing any liquid from leaking past the packing.

8. The method of claim 7, wherein substantially no vapor from the liquid being pumped passes past the packing.

9. The method of claim 7, wherein the stuffing box includes a wall defining an inner bore, a shaft spaced apart from and substantially parallel to the inner bore and a gland follower for compressing packing material within the stuffing box and the gland follower is tightened to an extent to prevent liquids from seeping past the packing.

10. The method of claim 7, wherein the yarns with expanded particles thereon are braided together.

11. The method of claim 10, including the steps of combining the yarns with expanded particles thereon into a rope of packing material; cutting pieces of the rope to form at least two outer rings and at least one inner ring; forming the pieces of rope into ring shapes in a die and compressing the pieces in the die to a state of partial compression less than the maximum compression, wherein the pieces for the outer rings are compressed to about 75% to 85% of their original height and the pieces for the at least one inner ring are compressed to about 85% to 95% of its original height.

12. The method of claim 11, wherein each of the rings has an inner surface configured to abut a shaft, side walls extending outwardly from the inner surface and an outer surface connecting the side walls and graphite foil is disposed on the inner surface of the rings.

* * * * *